United States Patent [19]

Barenboim et al.

[11] Patent Number: 6,059,555
[45] Date of Patent: May 9, 2000

[54] OPTICAL APPARATUS FOR DUAL-BEAM LASER TEXTURING

[75] Inventors: Michael Barenboim, Boca Raton, Fla.; Peter Michael Baumgart, San Jose, Calif.; Peter B. Chrusch, Boynton Beach; Benny Michael Harper, Boca Raton, both of Fla.; Benjamin Karni, San Jose, Calif.; Pieter J. M. Kerstens, Boca Raton, Fla.; Doug John Krajnovich, San Jose; Iraj Kahkesh Pour, Milpits, both of Calif.; Hong S. Seing, Boca Raton, Fla.; Andrew Ching Tam, Saratoga, Calif.

[73] Assignee: International Business Machines Corporation, Armonk, N.Y.

[21] Appl. No.: 08/707,383

[22] Filed: Sep. 4, 1996

[51] Int. Cl.[7] ........................................................ G11B 5/84
[52] U.S. Cl. ............................ 425/135; 264/400; 264/482; 425/174.4; 425/385; 425/810; 219/121.77
[58] Field of Search ................................. 425/174.4, 385, 425/810, 135; 264/1.27, 1.33, 400, 482; 219/121.77

[56] References Cited

U.S. PATENT DOCUMENTS

| | | | |
|---|---|---|---|
| 4,533,813 | 8/1985 | Rayburn et al. | 219/121 LH |
| 4,920,364 | 4/1990 | Andrews et al. | 346/160 |
| 5,062,021 | 10/1991 | Ranjan et al. | 360/135 |
| 5,108,781 | 4/1992 | Ranjan et al. | 427/53.1 |
| 5,528,922 | 6/1996 | Baumgart et al. | 73/1.79 |
| 5,586,040 | 12/1996 | Baumgart et al. | 364/474.08 |
| 5,595,768 | 1/1997 | Treves et al. | 425/174.4 |
| 5,595,791 | 1/1997 | Baumgart et al. | 427/554 |
| 5,658,475 | 8/1997 | Barenboim et al. | 219/121.77 |

FOREIGN PATENT DOCUMENTS

0652554A1  5/1995  European Pat. Off. .

OTHER PUBLICATIONS

Instruction Manual for Model 7300 Laser Systems, Spectra Physics, Mountain View, CA.

*Primary Examiner*—James P. Mackey
*Attorney, Agent, or Firm*—R. A. Tomlin; R. V. Davidge

[57] ABSTRACT

A disk texturing tool is used, for example, to provide textured spots in an annular portion of both sides of a hardfile disk. Disks are moved into and out of the texturing process in cassettes, through two disk-handling stations. An optical system includes a laser directed at a beamsplitter to split the laser beam into two beams having approximately equal power, which are directed along parallel paths through a power control optics block to expose simultaneously opposite sides of a disk to be textured. The power control optics block includes means for attenuating and measuring each of the two beams. A shuttling mirror directs these two beams alternately at a disk within each of the two disk handling stations.

16 Claims, 8 Drawing Sheets

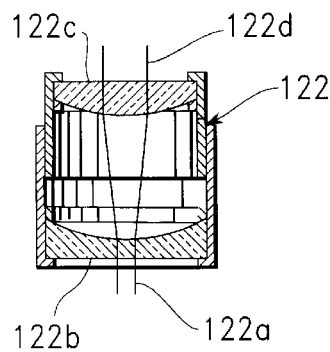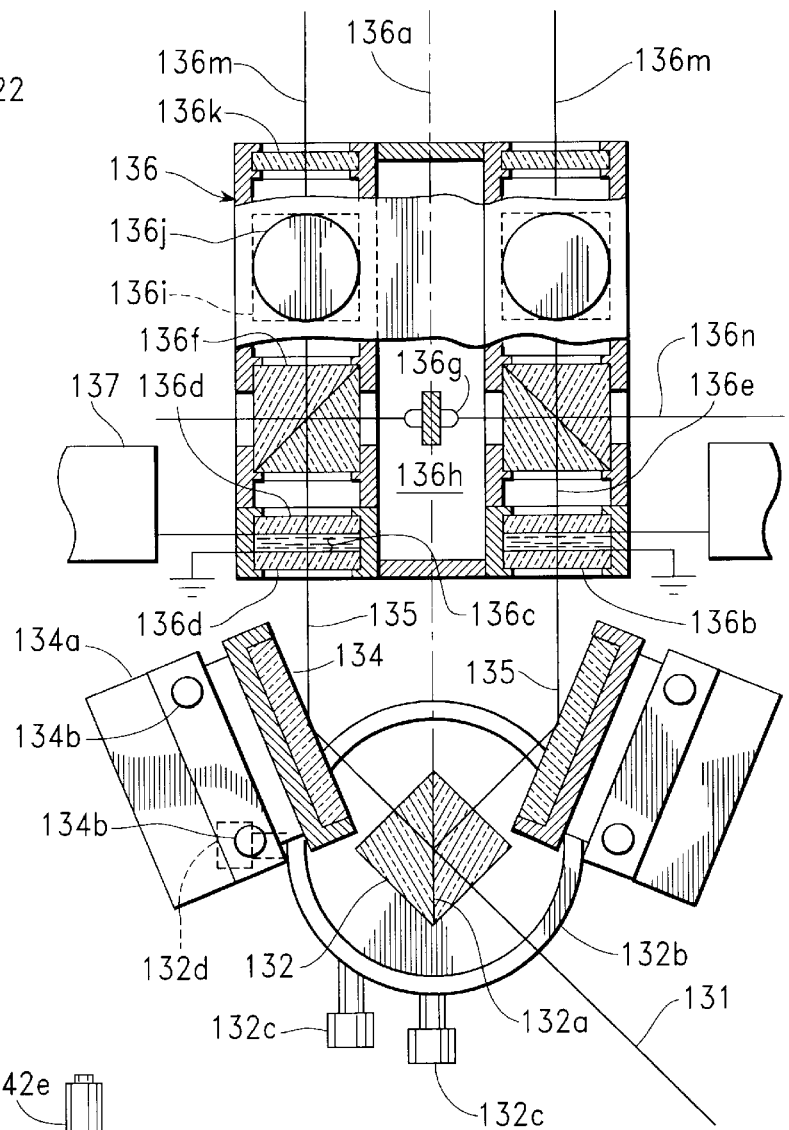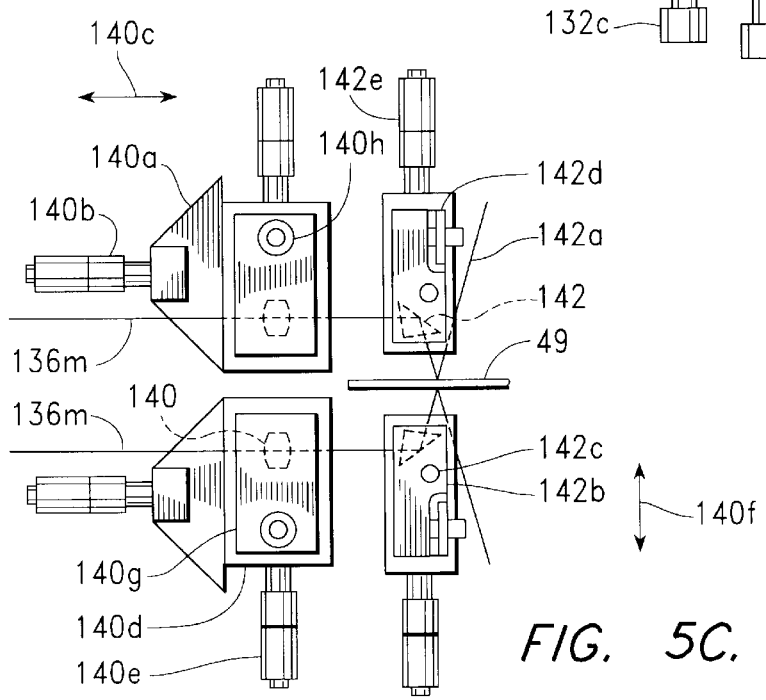

OPTICAL APPARATUS FOR DUAL-BEAM LASER TEXTURING

CROSS-REFERENCE TO A RELATED APPLICATION

A co-pending U.S. application, Ser. No. 08/150,525, filed Nov. 10, 1993, entitled "Procedure Employing a Diode-Pumped Laser for Controllably Texturing a Disk Surface," by Peter M. Baumgart, et al., having a common assignee with the present invention, the disclosure of which is hereby incorporated by reference, describes a process for creating a "distant bump array" surface texture in a magnetic recording disk for reducing stiction, together with the disk so textured. The texturing process uses a tightly focused diode-pumped Nd:YLF or Nd:YVO$_4$ or other solid-state laser that is pulsed with a 0.3–90 nanosecond pulse train to produce a plurality of distantly-spaced bumps in the disk surface. The bump creation process is highly controllable, permitting repeated creation of a preselected bump profile, such as a smooth dimple or one with a central protrusion useful for low stiction without close spacing or elevated "roughness." Some bump profiles permit texturing of the data-storage region of the disk surface for low stiction without materially affecting magnetic data storage density. The application, Ser. No. 08/150,525 has been abandoned and continued as Ser. No. 601,887 on Feb. 15, 1996, with a divisional application, Ser. No. 457,559 being filed from the original application on Jun. 1, 1995, and with a continuation, Ser. No. 889,348, of the divisional application being filed on Jul. 8, 1997.

Another co-pending U.S. application, Ser. No. 08/613,564, filed Mar. 11, 1996, which as subsequently issued as U.S. Pat. No. 5,658,475, entitled "Apparatus for Laser Texturing Disks," by Michael Barenboim, et al, having a common assignee with the present invention, further describes a laser texturing station in which the optical apparatus of the present invention may be used.

Another co-pending U.S. application, filed on an even day herewith, Docket Ser. No. 08/707,384 entitled "Apparatus and Method for Controlling a Laser Texturing Tool," and having a common assignee with the present invention, describes both electronic hardware and software used to control a laser texturing station in which the optical apparatus of the present invention may be used.

Another co-pending U.S. application, filed on an even day herewith, Ser. No. 08/707,385, entitled "Controlling Pulses in a Laser Texturing Tool," and having a common assignee with the present invention, describes a method for controlling the laser used with the optical apparatus of the present invention.

Another co-pending U.S. application, filed on an even day herewith, Docket Number BC9-96-046, which has been abandoned, entitled "Method for Controlling Laser Power in a Texturing Process," and having a common assignee with the present invention, describes a program for setting and maintaining the laser power levels in the optical apparatus of the present invention.

BACKGROUND OF THE INVENTION

1. Field of the Invention

This invention relates to apparatus for fabricating a disk, such as a magnetic recording disk used in a computer hard disk drive, having surfaces textured by exposure to a pulsed laser, and, more particularly, to optical apparatus for splitting the output beam from such a laser into a pair of sub-beams of equal, controlled intensity, which are individually directed along equal-length paths to opposite sides of the disk being textured.

2. Background Information

Current hard disk drives use a Contact Start-Stop (CSS) system allowing a magnetic head, used to read and write data, to contact the surface of a magnetic disk in a specific CSS region when the disk is stationary. Thus, before the rotation of a spinning disk has stopped, the magnetic head is moved to the CSS region, where the magnetic head settles on the surface of the disk. When the disk again starts to rotate, the magnetic head slides along the disk surface in this region, until the laminar air flow at the disk surface, due to its rotation, fully lifts the magnetic head from the disk surface.

After the magnetic head is lifted in this way, it is moved from the CSS region to another region of the disk to read and write data. The CSS region is preferably textured to minimize physical contact between the magnetic head and the disk surface. In this way, the contact stick-slip phenomenon often called "stiction" and other frictional effects are minimized, along with the resulting wear of the magnetic head surface. Outside the CSS region the remainder of the disk surface preferably retains a specular smoothness to permit high-density magnetic data recording.

3. Description of the Prior Art

U.S. Pat. No. 5,062,021, to Ranjan et al., describes a process in which magnetic recording media are controllably textured, particularly over areas designated for contact with data transducing heads. In conjunction with rigid disk media, the process includes polishing an aluminum nickel-phosphorous substrate to a specular finish, then rotating the disk while directing pulsed laser energy over a limited portion of the radius, thus forming an annular head contact band while leaving the remainder of the surface specular. The band is formed of multiple individual laser spots, each with a center depression surrounded by a substantially circular raised rim. The depth of the depressions and the height of the rims are controlled primarily by laser power and firing pulse duration. The shape of individual laser spots can be altered by varying the laser beam inclination relative to the disk surface. On a larger scale, the frequency of firing the laser, in combination with disk rotational speed controls the pattern or arrangement of laser spots. The smooth, rounded contours of the depressions and surrounding rims, as compared to the acicular character of mechanical textured surfaces, is a primary factor contributing to substantially increased durability of laser textured media.

SUMMARY OF THE INVENTION

In accordance with one aspect of the invention, there is provided a power control optics block for balancing the power in a pair of parallel polarized laser beams. The optics block includes an optical path through which each of the laser beams is directed, an attenuation mechanism disposed along each of the two optical paths, and a power detection mechanism disposed along each of the two optical paths. The two optical paths extend in a parallel, spaced-apart relationship. The attenuation mechanism controls the output power in the optical path extending within it. The power detection mechanism measures an output power level in the optical path extending through it.

BRIEF DESCRIPTION OF THE DRAWINGS

FIG. 5A is a longitudinal cross-sectional view of a beam expander in the tool of FIG. 4;

FIG. 5B is a partially sectional plan view of a beam splitter and power control optics block in the tool of FIG. 4;

FIG. 5C is a plan view of beam directing apparatus adjacent a disk being textured within the tool of FIG. 4;

DETAILED DESCRIPTION

Figure 1:
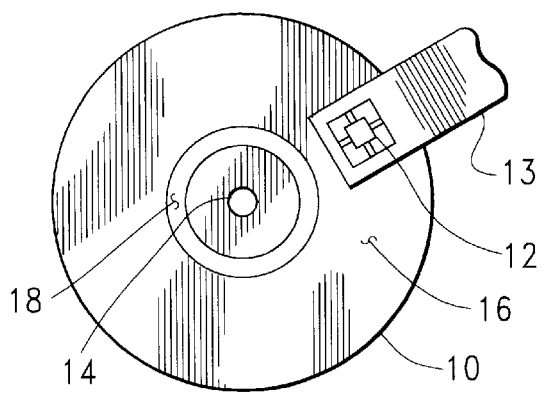
FIG. 1 is a plan view of an internal portion of a prior-art disk drive unit, including a rotatable magnetic disk having a textured annular region for CSS operation, and a magnetic head.

FIG. 1 is a plan view of a portion of a disk drive unit from the prior art for a computing system, including a rotatable magnetic storage disk 10, together with a magnetic head 12, which is driven in a generally radial direction relative to the disk 10 by means of a drive arm 13. This disk 10 is an example of the type of product which can be made using the apparatus of the present invention. When the disk drive unit is in operation, disk 10 is rotated about its central hole 14, forming a laminar flow of air holding magnetic head 12 slightly away from the adjacent disk surface 16. Before this rotation is stopped, magnetic head 12 is driven to be adjacent to a textured annular region 18 of the surface of disk 10. As this disk rotation slows and stops, the frictional and stiction effects occurring between the surface of annular region 18 and the adjacent contacting surface of magnetic head 12 are minimized by the textured nature of the surface of this region 18. Subsequently, when the rotation of disk 10 is restarted, these effects are again minimized, as the rate of rotation of disk 10 increases until the laminar flow of air near its surface lifts the adjacent surface of magnetic head 12 completely away from the disk surface. Thus, as the rotation of disk 10 is stopped and subsequently restarted, the wear of the surface of magnetic head 12 is minimized. Disk 10 is preferably a double-sided magnetic storage disk, with a second side, opposite the side shown in FIG. 1, having similar features.

Figure 2:
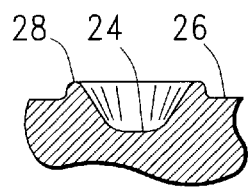
FIGS. 2 and 3 are transverse cross-sectional views of individual textured spots, which form examples of spots which may be made using the apparatus of the present invention, with the spot of FIG. 2, being formed particularly according to the method of U.S. Pat. No. 5,108,781, and with the spot of FIG. 3 being formed particularly according to the method of co-pending U.S. Application, Ser. No. 08/150,525.
Figure 3:
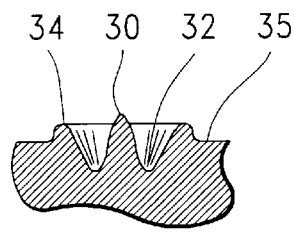

FIGS. 2 and 3 are transverse cross-sectional views of individual textured spots, which form examples of spots which may be made using the apparatus and method of the present invention.

FIG. 2 shows a portion of a disk surface roughened by the prior-art method taught by Ranjan, et al., in U.S. Pat. No. 5,062,021. With this method, a portion of the disk surface to be roughened is exposed to a pulse of laser light. The surface is heated rapidly, so that a part of the surface material is melted and then rapidly cooled, changing the surface topography to include a generally round central depression 24 below the nominal surface plane 26 and a generally round peripheral ridge 28 above this plane 26. The process described by Ranjan, et al. produces a ring of textured spots of this kind by repeatedly firing a laser as the disk being textured is rotated. The laser is then displaced radially through a pitch distance, and a second ring of textured spots, concentric with the first ring thereof, is produced. This process is repeated until texturing fills the annular region to be textured. The nature of each individual textured spot is determined primarily by the peak energy at which the laser is fired together with the pulse width. The distance between textured spots on the ring is determined by the relationship between the rate at which the laser is fired and the rotational speed at which the disk is turned.

FIG. 3 is a transverse cross-sectional profile of a laser textured spot produced using the method of the previously-described co-pending U.S. patent application, Ser. No. 08/150,525. The heights of surface features, compared to their widths, are exaggerated. A central protrusion 30 rises above the depth of the ring depression 32, preferably to a height somewhat greater than the height of the surrounding peripheral ring 34. The heights of the protrusion 30 and ring 34 above the nominally level surface 35 before texturing are determined by various laser and disk-material parameters, such as laser fluence, pulse width, spot size, and disk surface composition.

Figure 4:
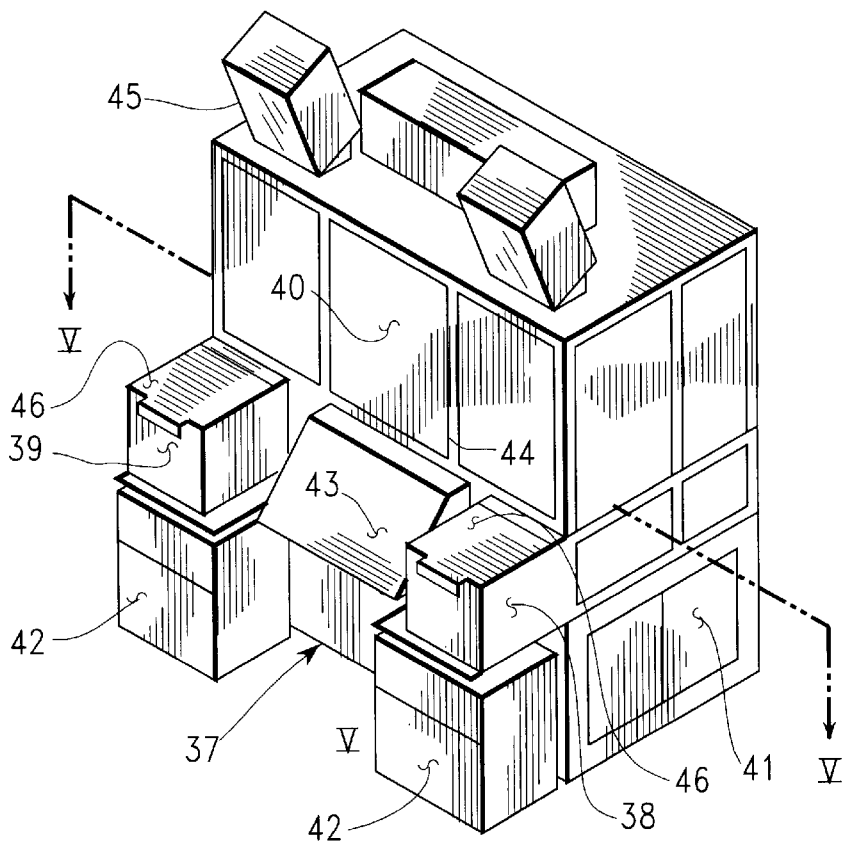
FIG. 4 is an isometric view of a laser disk texturing tool built in accordance with the present invention.

FIG. 4 is an isometric view of a laser-texturing tool 37, built in accordance with the present invention, which is used to apply laser-texturing to disks in a non-stop production mode as long as cassettes filled with disks are loaded and unloaded at a sufficient rate. These cassettes move through a right disk-handling station 38 and a left disk-handling station 39, with individual disks from these stations 38 and 39 being alternately textured by a single laser assembly in a laser-texturing station 40. A modular configuration allows the tool 37 to continue running, at a reduced rate of production, even if one of the disk-handling stations 38, 39 cannot be used.

The laser-texturing tool 37 is a self-contained system, with necessary electrical, electronic, and pneumatic components located in a base section 41 and in a pair of instrumentation cabinets 42. Various controls and output devices are placed on a slanted control panel 43. Since the infrared laser used in the texturing process produces invisible, potentially-harmful rays, a laser-texturing station 40 is housed in a light-tight cabinet within the tool 37, with a safety switch operated by the opening of each access door 44 turning off the laser. Furthermore, these doors 44 can be opened only when the tool is in a maintenance mode. The tool 37 is switched between automatic and maintenance modes by turning a mode switch (not shown) on control panel 43. Two television cameras (not shown), mounted within the laser-texturing station, allow the process to be viewed on a pair of monitors 45.

The upward-opening doors 46 of disk-handling stations 38 and 39, providing access for loading and unloading cassettes holding disks, are not interlocked, and may be opened or closed at any time, even during the operation of the texturing process. Within the tool 37, rays from the laser are blocked from the areas in which these cassettes are loaded and unloaded.

Figure 5:
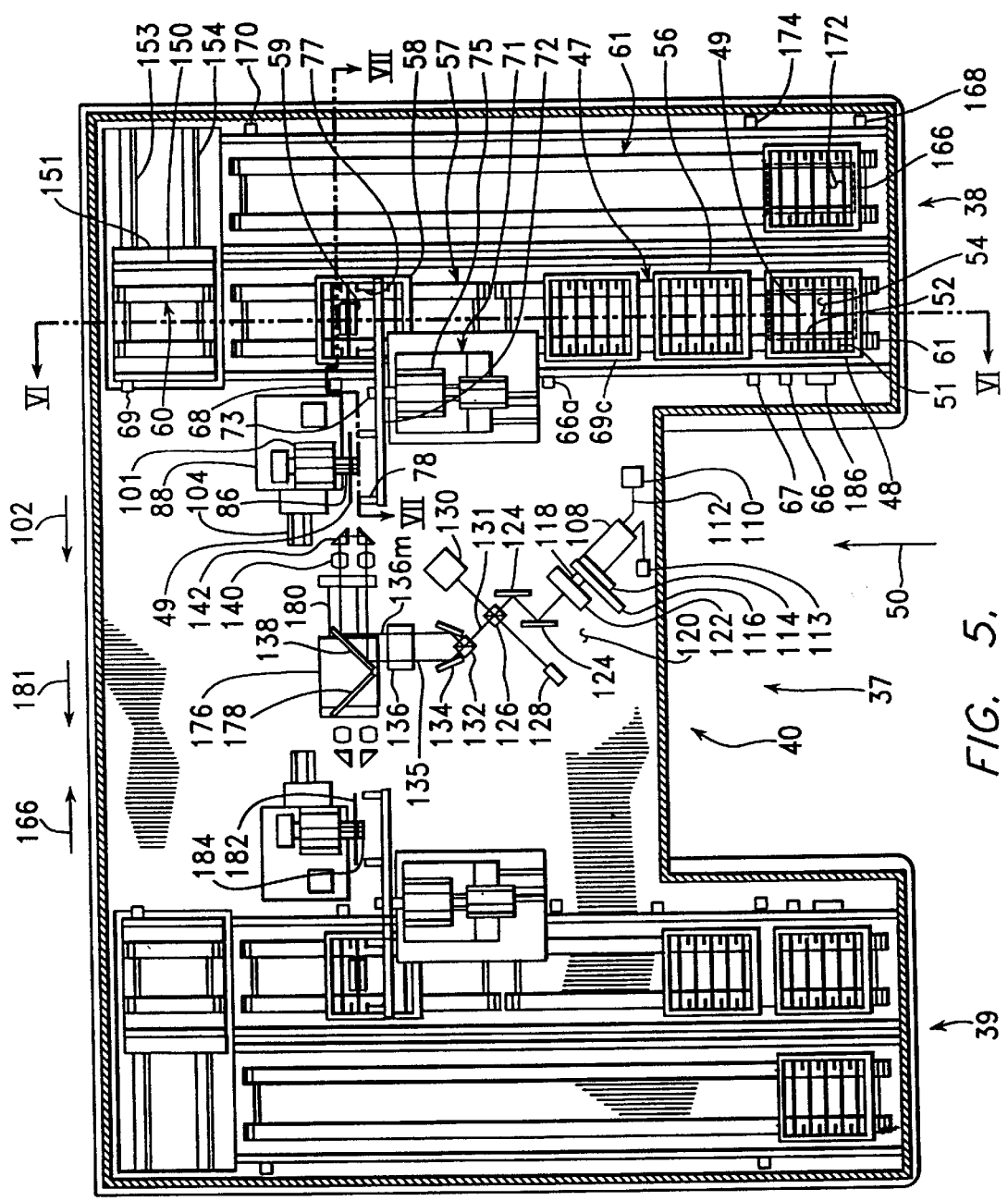
FIG. 5 is a cross-sectional plan view of the tool of FIG. 4, taken as indicated by section lines V—V in FIG. 4 to show disk-handling and laser-texturing stations thereof.

FIG. 5 is a horizontal cross-sectional view of laser-texturing tool 37, taken as indicated by section lines V—V in FIG. 4, to reveal particularly disk-handling stations 38, 39 and the laser-texturing station 40. Left disk-handling station 39 is a mirror image of right disk-handling station 38. Each disk-handling station 38, 39 has an input conveyor 47 carrying cassettes 48 loaded with disks 49 to be textured, rearward, in the direction of arrow 50. Each cassette 48 has a number of pockets 51 in which disks 49 are loaded in a vertical orientation, and a lower opening 52 allowing the removal of individual disks by lifting from below. While FIG. 5 shows cassettes having only five disks, for clarity, in reality a cassette for this system typically holds 25 disks.

Figures 6, 7:
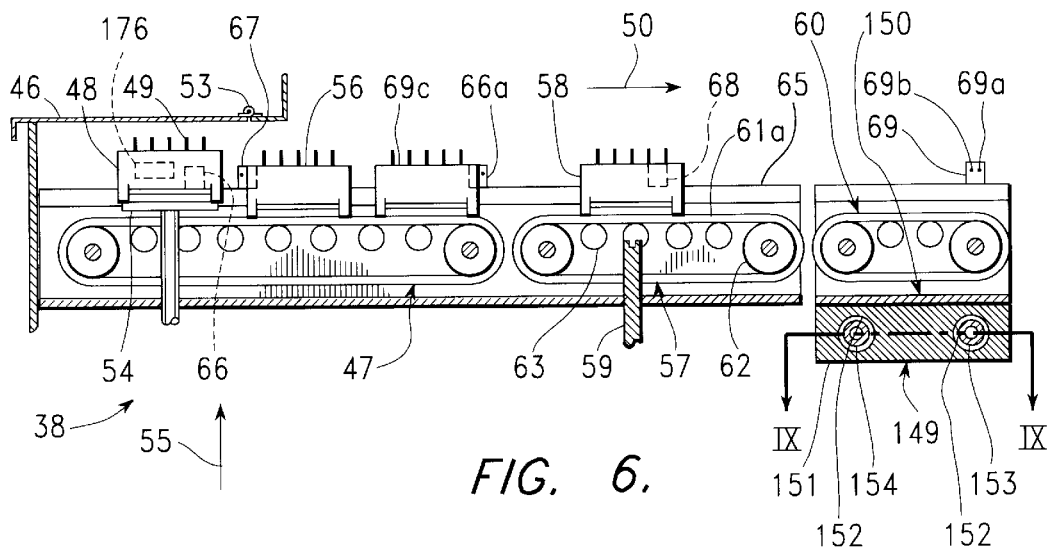
FIG. 6 is a cross-sectional side elevational view of the tool of FIG. 4, taken as indicated by section lines VI—VI in FIG. 5 to show mechanisms used to handle cassettes holding disks for texturing.
FIG. 7 is a cross-sectional rear elevational view of the tool of FIG. 4, taken as indicated by section lines VII—VII in FIG. 5 to show the mechanism used to transfer disks from cassettes within the disk-handling stations to the laser-texturing station and to return the disks to the cassettes.

FIG. 6 is a cross-sectional side elevational view of the tool of FIG. 4, taken as indicated by cross-section lines VI—VI in FIG. 5, to show the conveyor systems moving cassettes filled with disks into and through the process. The tool operator loads a cassette 48 filled with disks 49 to be textured by opening the access door 46, which pivots upward along its rear hinge 53. The cassette 48 is normally loaded onto a raised platform 54, which, in this position holds the cassette 48 upward, in the direction of arrow 55, away from input conveyor 47, allowing this conveyor 47 to move another cassette 56 stored in a queue on the conveyor 47 without simultaneously moving the most-recently loaded cassette 48. FIG. 6 also shows a cassette indexing conveyor 57, which moves a cassette 58 in incremental motions above a disk lifter 59, so that the disk lifter 59 can remove individual disks 49 from the cassette 58 for placement into the laser-texturing process, and so that the disk lifter 59 can subsequently return textured disks to the cassette 58. FIG. 6 also shows a transfer table conveyor 60, which is used in the movement of cassettes filled with textured disks from indexing conveyor 57 to an output conveyor 61 (shown in FIG. 5).

FIG. 7 is a cross-sectional rear elevational view of the tool of FIG. 4, taken as indicated by section lines VII—VII in FIG. 5 to show the mechanism used to transfer disks from a cassette 58 within the disk-handling station 38 into the laser texturing process and to return textured disks to the cassettes. FIG. 7 also provides a transverse cross-sectional views of cassette indexing conveyor 57 and of output conveyor 61.

The movement of a cassette to the point at which individual disks are removed from the cassette to be carried into the texturing process will now be discussed, with particular reference being made to FIGS. 6 and 7.

Thus, referring to FIGS. 5, 6, and 7, each conveyor 47, 57, 60, 61 includes a belt 61a extending under each side of a cassette 48, 56, 58 loaded thereon. Each belt 61a extends between a pair of end rollers 62 and above a number of idler rollers 63. At one end of each conveyor 47, 57, 60, 61 the end rollers 62 are driven in either direction by a motor 64. This system for cassette transport also includes a pair of lateral guides 65, ensuring that each cassette stays in place atop the conveyors, and cassette detectors 66, 66a, 67, 68, 69, which determine when a cassette reaches an adjacent point along a conveyor system. Each cassette detector 66, 66a, 67, 68, 69 includes a light source 69a which is reflected off an adjacent surface of a cassette when such a surface is present, to be detected by a receiver 69b, which in turn provides an input to a computing system 70 controlling the operation of the motors 64 and other motors, solenoids, and valves within the laser-texturing tool 37 to effect operation as described herein.

When cassette 48 is placed on top of raised platform 54, its presence is detected by first input cassette detector 66. Since the input conveyor 47 and the system logic controlling its movement are configured to allow the queuing of cassettes, the subsequent movement of the cassette 48 is determined by whether other cassettes are already present on input conveyor 47 and indexing conveyor 57. If no cassette is already present on these conveyors 47, 57 (i.e., if cassettes 56, 58, and 69c are not present), platform 54 is lowered, so that the cassette 48 rests on top of input conveyor 47, and the conveyors 47, 57 are turned on to move cassette 48 rearward, in the direction of arrow 50. When indexing cassette detector 68 detects the presence of a cassette being moved in this way, input conveyor 47 and indexing conveyor 57 are stopped, leaving the cassette positioned so that the first of its pockets 51 in which diskettes 49 may be placed (i.e. the end pocket farthest in the direction indicated by arrow 50) is directly over disk lifter 59.

On the other hand, if a cassette 58 is present on indexing conveyor 57, and if no other cassette 56, 69c is present on input conveyor 47, when cassette 48 is placed on raised platform 54, this platform 54 is lowered, and conveyor 47 is turned on to move cassette 48 in the direction of arrow 50. This movement is stopped when the presence of the cassette 48 is detected by second input cassette detector 66a, leaving the cassette queued on the input conveyor 47, in the position in which cassette 69c is shown.

If a cassette 58 is present on indexing conveyor 57, and if a single cassette 69c is present on input conveyor 47, when cassette 48 is placed on raised platform 54, this platform 54 remains raised while input conveyor 47 is turned on to move cassette 69c opposite the direction of arrow 50 until this cassette 69c is sensed by third cassette sensor 67. Then, platform 54 is lowered, and input conveyor 47 is turned on to move both cassettes 48, 69c in the direction of arrow 50. This movement is stopped when cassette 69c is detected by second cassette sensor 66a, leaving both cassettes 48, 69c queued on input conveyor 47.

Finally, if all three cassettes 56, 69c, and 58 are present on conveyors 47, 57 when cassette 48 is placed on raised platform 54, the movement of cassettes does not directly ensue, leaving cassettes 56, 69c queued on input conveyor 47 and cassette 48 queued on raised platform 54.

When the texturing process has been completed on all of the disks 49 to be textured within the cassette 58 on indexing conveyor 57, this conveyor 57 and transfer table conveyor 60 are turned on to move the cassette 58 rearward, in the direction of arrow 50, completely onto the transfer table conveyor 60. This motion is stopped when the presence of cassette 58 is detected by transfer table cassette detector 69. If cassette 56 is present on input conveyor 47, as determined by second input cassette detector 67, when cassette 58 is transferred from indexing conveyor 57 in this way, this queued cassette 56 is moved by conveyors 47, 57 to the point at which its presence is detected by indexing cassette detector 68. If a second queued cassette 48 is present on raised platform 54 when a first queued cassette 56 is moved from input conveyor 47 to indexing conveyor 57, platform 54 is lowered, and the first queued cassette 48 is driven by input conveyor 47 until the presence of the cassette 48 is detected by second input cassette detector 67.

The movement of an individual disk from a cassette into the texturing process will now be discussed, with particular reference being made to FIGS. 5 and 7.

Thus, referring to FIGS. 5 and 7, to allow the movement of individual disks 49 through the laser-texturing process, indexing conveyor 57 moves cassette 58 in a number of rearward and forward motions, in and opposite the direction of arrow 50, sequentially aligning the individual disk pockets 51 of the cassette 58 with a disk lifter 59. Disk lifter 59 includes a proximity sensing mechanism 70a, for determining whether a disk 49 is present in each pocket 51. This sensing mechanism 70a consists of an internal light source aimed at an adjacent edge 70b of a disk present in a pocket 51 and an internal sensor detecting light reflected from such an edge 70b. The output of sensing mechanism 70a provides an additional input to computing system 70. Thus, cassette 58 is moved to the rear, in the direction of arrow 50, by indexing conveyor 57, until proximity sensing mechanism 70a indicates the presence of a disk 49 in a particular pocket 51, passing any empty pockets 51 within the cassette 58. When a disk is detected by proximity sensing mechanism 70a, the rearward movement of cassette 58 is stopped, and the disk lifter 59 moves upward, in the direction of arrow 55, carrying the disk 49 which is aligned the lifter 59 upward for transfer to a pick-and-place mechanism 71.

Pick-and-place mechanism 71 has an arm 72 rotatable about the axis of a drive shaft 73, in and opposite the direction of arrow 74, in 180-degree increments. This rotation is effected by the incremental operation of arm drive motor 75. At each end of arm 72, a pair of grippers 77, 78 is movable between an open position, in which grippers 77 are shown, and a closed position, in which grippers 78 are shown, by means of a pneumatic actuator 79. When a pair of grippers 77, 78 is in the closed position, a disk placed between the grippers is held by four points around its periphery. When the pair of grippers is opened, a disk held in this way is released. The pick and place mechanism 71 is also moved rearward, in the direction of arrow 50, into a position in which disks are picked up and released, and forward, in the direction opposite arrow 50, into a position in which arm 72 is rotated.

The upward movement of disk lifter 59 carries a disk 49, which is to be textured next, upward into the location indicated by phantom line 82. This motion, which brings the disk 49 into vertical alignment with the open grippers 77 of arm 72, occurs with pick and place mechanism 71 in its forward position (i.e., moved opposite the direction of arrow 50), allowing the upward passage of disk 49 past grippers 77. At this point, the disk rests within a groove 84 of the lifter 59. Next, pick and place mechanism 71 moves in the direction of arrow 50 to its rearward position, aligning the open grippers 77 with the edge of disk 49. Then, grippers 77 are closed, grasping the disk 49. Disk lifter 59 next descends to disengage from the periphery of disk 49. Next, pick and place mechanism 71 moves opposite the direction of arrow 50 to its forward position, and the arm 72 rotates 180 degrees in the direction of arrow 74, placing disk 49 in the position indicated by phantom line 83, in axial alignment with a spindle 86 of a spindle assembly 88. Then, pick-and-place mechanism 71 returns in the direction of arrow 50 to its rearward position, placing the disk 49 on the end of spindle 86.

Figure 8:
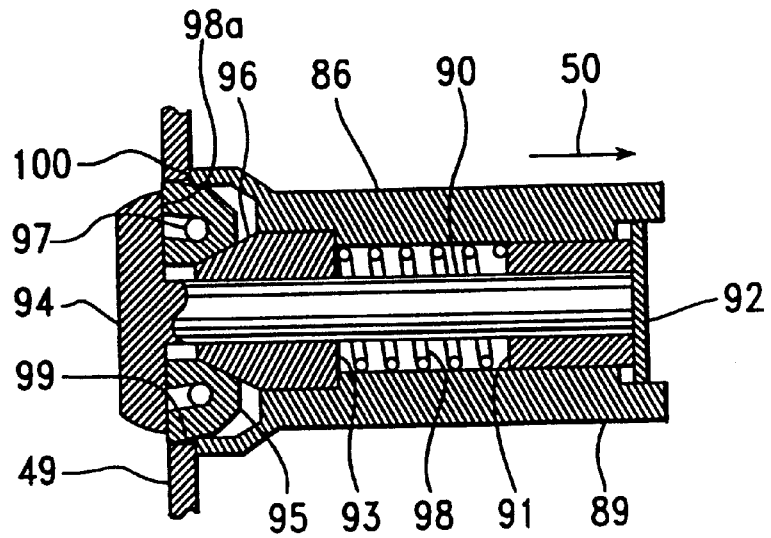
FIG. 8 is a longitudinal cross-sectional view of an end portion of a spindle, used to move disks through the texturing process in the tool of FIG. 4.

FIG. 8 is a longitudinal cross-sectional view of the end of spindle 86, which includes a rotationally-driven outer cylinder 89, in which an internal shaft 90 slides axially, in and opposite the direction of rearward-pointing arrow 50. A sliding bushing 91 and a piston 92, and a front end cap 94 move axially with internal shaft 90, while a front bushing 93 is held in place within the outer cylinder 89. A number of curved clamping blocks 95 extend around a truncoconical surface 96 of front bushing 93, being held inward, against this surface 96, by an elastomeric "O"-ring 97.

The internal shaft 90 is held in the rearward position shown (i.e. in the direction of arrow 50) by means of a compression spring 98 pressing an adjacent surface of the sliding bushing 91. With internal shaft 90 held rearward in this way, inner face 98a of end cap 94 pushes clamping blocks 95 rearward and outward, along truncoconical surface 96. This motion of the clamping blocks 95 grasps inner surface 99 of the disk 49, holding the disk in place against a front face 100 of outer cylinder 89. The disk 49 is released by applying a force to piston 92 in a forward direction, opposite the direction of arrow 90, to overcome the force exerted by compression spring 98, so that the internal shaft 50 is moved forward, opposite the direction of arrow 50. This force may be applied by a number of well known methods, such as through a pneumatically operated push-rod operating on piston 92. The resulting movement of end cap 94 allows the clamping blocks 95 forward and inward, releasing disk 49 from the spindle 86.

Referring to FIGS. 5, 7, and 8, pick-and-place mechanism 71 next moves to the rear, in the direction of arrow 50, placing the disk 49 to be textured, which is now at the position indicated by phantom line 83 in FIG. 7, on end cap 94 of spindle 86, with inner shaft 90 held in its forward position, so that clamping blocks 95 are retracted inward. Next, inner shaft 90 is moved to its rearward position, so that clamping blocks 95 are moved outward, clamping the disk 49 in place, and the grippers, which have been holding the disk on arm 72, open, releasing the disk 49. After disk 49 is placed on spindle 86, the pick-and-place mechanism 71 moves forward, opposite the direction of arrow 50, and the spindle drive motor 101 of spindle assembly 88 begins to rotate spindle 86 to bring the disk 49 up to a rotational velocity at which exposure to laser pulses will occur. The spindle assembly 88 also begins to move inward, in the direction of arrow 102, being driven by a spindle translation motor 104, carrying the disk 49 into the texturing process.

The laser-texturing station 40 will now be discussed, with specific references being made to FIG. 5.

Thus, referring to FIG. 5, within the laser-texturing station 40, a beam from an infrared pulsed laser 108 is used to produce the desired surface texturing on the disk 49. As described in the co-pending application referenced above, the laser 108 may be, for example, a Nd:YLF solid state laser, providing an output at a wavelength of 1.047 microns, or Nd:YVO$_4$ solid state laser, operated with a diode pumping signal, driven from a laser diode 110 through a fiber-optic cable 112, and pulsed by a Q-switch control 113. A beam from the laser 108 is directed through an electronic process shutter 114 and a mechanical safety shutter 116. When the laser-texturing station 40 is operating, a train of laser pulses is emitted from the laser 108, with the actual texturing process being started and stopped by opening and closing the electronic process shutter 114.

The process shutter 114 is actually a mechanical shutter which is opened and held open by the operation of an electromagnet (not shown). The termination of the flow of current through the electromagnet causes the process shutter to close. The operation of process shutter 114, and hence of the process of texturing an individual disk, is electronically controlled in response to the position of the disk to be textured, as determined through the use of a signal generated in response to the movement of, for example, the spindle assembly 88.

The safety shutter 116 remains open during the entire texturing process, unless an error condition, such as a jam of a disk or cassette, occurs. The detection of such an error condition causes the safety shutter 116 to close, by means of the software running the laser-texturing tool 37. The laser 108, electronic process shutter 114, and safety shutter 116 together form a light-tight assembly, from which even a portion of the laser beam cannot escape when either shutter 114, 116 is closed.

After passing through the shutters 114, 116, the laser beam enters a polarizing beamsplitter 118, which is oriented so that the portion of the laser beam, if any, having an unwanted p-polarization is directed downwards toward an underlying plate 120, leaving the portion of the laser beam having a vertical s-polarization to propagate through the remaining optical path. Next, the laser beam passes through a 3×beam expander/collimator 122, which permits the adjustment of the infrared laser spot size at a lens entrance.

FIG. 5A is a longitudinal cross-sectional view of the beam expander/collimator 122. The input beam 122a passes through a diverging lens 122b, which causes the divergence, or expansion, of the beam, and through a converging lens 122c, which reduces the divergence of the beam leaving as output beam 122d. The distance between the beam expander lenses 122b, 122c is manually adjustable through the rotation of a threaded mechanical connection between the lens mounts. In the example of the laser-texturing tool 37, this adjustment is made to provide a slightly diverging output beam 122d.

Referring again to FIG. 5, from expander collimator 122, the laser beam is directed by a pair of dielectric-coated steering mirrors 124 to a dichroic beamsplitter 126. A visible laser beam, for example from a 2-mW laser diode 128, is also directed toward the beamsplitter 126, permitting alignment of the optical system by tracing the red laser dot. The infrared beam from laser 108 is made to be coincident with the red beam from laser diode 128 by manipulating the two steering mirrors 124. About three percent of the laser beam entering beamsplitter 126 from the infrared laser 108 is reflected from the beamsplitter 126 to a power detector 130, which provides in-situ monitoring of the laser power.

The infrared laser beam 131 leaving the dichroic beamsplitter 126 is directed to a non-polarizing beamsplitter cube 132, which splits the beam into two beams that are equal in intensity within five percent. These two beams are directed, by means of a pair of steering mirrors 134, toward opposite sides of the disk being carried through the texturing process by spindle assembly 88. After reflection off these steering mirrors 134, the laser beams travel as a pair of parallel beams 135, separated by a distance of 25 mm, to enter a power control optics block 136, in which the intensity of the two beams is balanced by controlling the voltage applied to liquid-crystal variable retarders. In this way the intensity of the parallel laser beams leaving the power control optics block 136 is made equal within one percent.

FIG. 5B is a partially sectional plan view of the beamsplitter cube 132, together with steering mirrors 134 and the power control optics block 136. The two laser beams 135 forming inputs to the block 136 extend parallel to, and equally offset from, an axis 136a of the power control optics block 136, about which the various elements of this block 136 are symmetrically deployed. Symmetrical beams 135 result from the fact that the input beam 131 to the beamsplitter cube 132 is directed at a 45-degree angle with respect to the optics block axis 136a, with the reflective surface 132a within the beamsplitter cube being aligned along the optics block axis 136a. Each of the steering mirrors 134 is aligned to be struck by an associated beam from the beamsplitter cube 132 at an angle of incidence of 67.5 degrees.

Referring to FIG. 5B, adjustments for bringing the separate laser beams 135 into a parallel condition, and for otherwise aligning them, are provided by several manually turned knobs. Beamsplitter cube 132 is mounted on a rotary stage 132b, with a pair of knobs 132c tilting the cube 132 about orthogonal axes, and with a knob 132d providing for the rotation of the cube 132. For example, a rotary stage suitable for this application is supplied by the Newport Corporation of Irvine, Calif., under their part number P032N. Each steering mirror 134 is mounted by an adjustable mirror mount 134a, which includes a pair of knobs 134b used to tilt the associated mirror 134 about mutually perpendicular axes. Mirror mounts suitable for this application are supplied, for example by the Ealing Electro Optics, Inc. Holliston, Mass., under their catalog number 37-4777.

Within the power control optics block 136, the power of the two beams 135 from beamsplitter cube 132 is balanced, so that these beams have power levels within one percent of one another. The beamsplitter cube 132 splits the single beam arriving from the laser into a pair of beams 135 having power levels within five percent of one another. While the beamsplitter cube 132 is a non-polarizing device, the laser beams 135 entering the power control optics block 136 are nominally, or predominately, s-polarized, having passed through polarizing beamsplitter 118 (shown in FIG. 5).

Within the power control optics block 136, each of these beams 135 first enters a liquid crystal variable retarder 136b. Each of these retarders 136b includes a cavity 136c formed between a pair of fused silica windows 136d spaced a few microns apart. The interior surface of each window 136d has a transparent conductive indium tin oxide coating. The cavity 136c is filled with birefringent nematic liquid crystal material with molecules that tip according to a voltage applied between the transparent conductive coatings of the windows 136c. The angle of polarization of the laser beam 135 entering each retarder 136b is changed according to the voltage applied across the cavity 136c by means of the coatings on windows 136d. Thus, the s-polarization of each beam 135 entering a retarder 136b is altered, in a continuously variable manner, toward a p-polarization of the beam 136e leaving the retarder 136b. A suitable liquid crystal variable retarder may be obtained, for example, from Meadowlark Optics, of Longmont, Co., under their part number LVR-100-1047-V.

The voltage signal driving each liquid crystal variable retarder 136b is provided by the output of a function generator 137, which preferably produces a DC-balanced 2kHz square wave having an amplitude which is adjustable to determine how the polarization of the beam passing through the retarder 136b is altered.

After exiting the retarder 136b, each beam 136e enters a polarizing beamsplitter 136f, which reflects s-polarized power inward to a beam dump 136g to be dissipated within a cavity 136h, while transmitting p-polarized energy to an non-polarizing beamsplitter 136i. Each non-polarizing beamsplitter 136i reflects about one percent of the energy incident upon it upward, providing the input to a power detector 136j. The remaining energy is transmitted through a quarter-wave plate 136k, which converts the p-polarized energy incident upon it into a circularly-polarized beam 136m exiting the power control optics block 136.

Referring to FIGS. 5 and 5B, independent means to measure and control the power levels of the single beam 135 derived from the output of laser 108 and of each of the beams 136*m* exiting the power control optics block 136 are provided. The power level of the single beam 131, which is measured by monitoring the output of power detector 130, is controlled, or attenuated, by varying an input signal to laser 108. The combination of a retarder 136*b* with a polarizing beamsplitter 136*f* provides a convenient way to control the power level of each beam 136*m* exiting the block 136, while the combination of a non-polarizing beamsplitter 136*i* with a power detector 136*j* provides a convenient means for measuring this power level. The output signals from power detectors 130, 136*j* are individually calibrated using measurements of beams 136*m* at the exit of the power control optics block, or farther along the optical path toward the point at which a disk 49 is textured. This type of calibration is generally needed because of a number of factors, such as differences in the percentage of incident power reflected within the beamsplitters 126, 136*i* aiming beams at these power detectors. The outputs of power detectors 130, 136*j* are preferably displayed externally on the laser texturing tool 37 (shown in FIG. 4).

A method for manually setting-up or readjusting the various laser power levels includes the steps of monitoring the outputs of power detector 130 and making corresponding adjustments to a signal driving the laser 108. The two beams 136*m* are balanced by observing the outputs of both power detectors 136*j* with both retarders 136*b* set to transmit maximum levels of p-polarized power, and by reducing the level of p-polarized power transmitted by the retarder corresponding to the higher power level read by one of the power detectors 136*j*, until these two detectors indicate the same power level, with calibration factors being considered. As the level of p-polarized power is decreased in either of the beams, the level of power present in the corresponding output beam 136*m* is decreased, as the increased s-polarized power is rejected inward by the polarizing beam splitter 136*f*. In this way, the output levels of the two beams are balanced by attenuating the beam initially having the higher level.

In the example of FIG. 5, the parallel laser beams 136*m* from power control optics block 136 are reflected off a right shuttling mirror 138, being directed toward a disk carried through the texturing process from the right disk-handling station 38.

FIG. 5C is a plan view of the optical devices associated with the right disk-handling station 38. For example, each of these beams 136*m* passes through a focussing achromatic triplet lens 140, having a focal length of 25 mm, and is reflected toward the surface of the disk 49 being textured by a right-angle prism 142.

Referring to FIG. 5C, each lens 140 is mounted in a finely adjustable manner, permitting the adjustments needed to center the beam and to achieve optimum focus on each side of the disk 49. A first stage 140*a*, moved by a first micrometer-type screw mechanism 140*b* allows a lens focussing adjustment in the directions of arrow 140*c*. A second stage 140*d*, moved by a second screw mechanism 140*e*, allows lateral movement of the lens 140, in the directions indicated by arrow 140*f*. A third stage 140*g*, in which the lens 140 is mounted, allow vertical movement through the rotation of a third mechanism 140*h*.

Each prism 142 is slightly tilted, so that a laser beam reflected off the surface of the disk being textured is not transmitted back through the optical path, being instead generally reflected outward as a reflected beam 142*a*. Each prism 142 is mounted on a pivot arm 142*b*, pivotally mounted by a pin 142*c* to a stage 142*d*, which is in turn moved in the directions of arrow 140*f* by a micrometer-type screw mechanism 142*e*. The pivotal movement of each pivot arm 142*b* may be used to set the point on the disk 49 at which texturing begins. This type of adjustment is particularly useful for adjusting the process to produce textured surfaces on each side of the disk 49, starting and ending at the same diameters on the disk. When this is done, since the pivot pin 142*c* is offset from the reflective surface of the prism 142, the laser beam is expected to move along this reflective surface. If this movement displaces the laser beam too far from the center of this reflective surface, the position of prism 142 is corrected with screw mechanism 142*e*.

Referring again to FIGS. 5 and 5A, and continuing to refer to FIG. 5C, beam expander 122 is adjusted by changing the distance between 122*b* and lens 122*c*, during the initial adjustment of this apparatus, so that the laser beam 122*a* entering the beam expander 122 at a diameter of about 0.5 mm leaves the beam expander 122 as beam 122*d* with a diameter of about 1.3 mm, and so that the beam entering a focussing lens 140 has a diameter of about 1.5 mm. This lens 140 is focussed by movement in the direction of arrow 140*c*, using the screw mechanism 140*b*, so that the laser beam has a diameter of about 20 microns at the surface of a disk 49 being textured. An independent adjustment of this kind is made to focus a beam on each side of the disk 49.

Further adjustments of the beam expander 122 and of each focussing lens 140 may be made to effect changes in the process and in the textured spots generated on the disk 49. In general, adjusting the beam expander 122 to increase the diameter of the laser beam striking each focussing lens 140 makes it possible to focus a smaller beam diameter on the disk 49.

Referring to FIGS. 5, 5B, and 5C, despite the precaution of tilting each prism 142, to prevent the return of laser power reflected off the disk 49 within the optical path, some such power can be expected to return, due particularly to reflection from the non-uniform disk surface produced by the texturing process. However, the s-polarized light reflected back along the optical paths in this way is rejected by each polarizing beamsplitter 136*f* in the power control optics block 136, being directed outward as a beam 136*n*.

The movement of a disk through the laser-texturing process, and its subsequent return to the cassette from which it has been taken, will now be discussed, with particular reference being made to FIGS. 5 and 7.

Thus, referring to FIGS. 5 and 7, the disk 49 clamped to spindle 86 is first brought up to the rotational speed desired for the texturing process, as the motion of spindle assembly 88 drives the disk 49 inward, in the direction of arrow 102, to or past the point at which the inner diameter, indicated on FIG. 7 by phantom line 146, of the surfaces to be textured is adjacent to the point at which exposure will occur to laser beams reflected from prisms 142. The actual exposure, which is started by opening electronic process shutter 114, occurs as the disk 49 is rotated, for example, at a constant speed, by spindle drive motor 101 and as the disk 49 is moved in the outward direction, opposite arrow 102, for example, at a constant speed, by the spindle translation motor 104. When the disk 49 passes the point at which the outer diameter, indicated by phantom line 148, of the surfaces to be textured is adjacent to the point at which exposure occurs to laser beams reflected from prisms 142, electronic process shutter 114 is closed to terminate the exposure of the surfaces of disk 49 to the laser beam. Thus, an annular space on disk 49 is textured by placing a number of laser-generated texture patterns along a spiral, with the distance between the patterns adjacent along the spiral being determined by the rate at which laser 108 is pulsed, and by the rate of rotation of spindle 86, while the distance between radially adjacent segments of the spiral is determined by the rates of rotation and translation of spindle 86.

After completion of the texturing process, the rotation of spindle 86 is stopped, or allowed to decelerate, as the spindle assembly 88 continues moving outwardly, opposite arrow 102, to stop in the position adjacent to grippers 78, at the inward-extending end of the arm 72. At this point, the arm 72 is held forward, in the direction opposite arrow 50, so that the disk 49 can pass behind the grippers 78, which are held open. When this outward motion of spindle assembly 88 is complete, and when the rotational motion of spindle 86 is fully stopped, the arm 72 is moved rearward, and the grippers are closed to engage the disk 49. Next, the shaft 90 (shown in FIG. 8) is moved forward so that the clamping blocks 95 (also shown in FIG. 8) are retracted inward, releasing the disk 49 from spindle 86. Then, the arm 72 is moved forward, opposite the direction of arrow 50, and arm 72 is rotated 180 degrees about the axis of its drive shaft 73, opposite the direction of arrow 74, and the arm 72 is moved rearward, in the direction of arrow 50, moving the disk 49, which has most recently been textured, into position above the disk lifter 59. Next, lifter 59 moves upward, accepting the textured disk in its groove 84. The grippers on arm 72 holding the textured disk are opened, and the lifter 59 then descends, placing the textured disk 49 in a pocket 51 within the cassette 58.

The preceding discussion has described the movement of a single disk 49 from the cassette 58, in right disk-handling station 38, through the texturing process in laser-texturing station 40, and back into the cassette 58. In a preferred version of the present invention, two disks are simultaneously moved in opposite directions between the cassette 58 and the spindle 86, which carries each disk through the texturing process. This type of disk movement will now be described, with particular references being made to FIGS. 5 and 7.

Referring to FIGS. 5 and 7, except during the movement of the first and last disks 49 held within an individual cassette 58, each rotational movement of arm 72 in or opposite the direction of arrow 74 preferably carries one disk 49 from the disk lifter 59 to spindle 86 within grippers 77, while another disk 49 is simultaneously carried within grippers 78 from the spindle 86 to disk lifter 59. Sequential rotational movements of arm 72, which are similar in their movement of disks, occur in opposite rotational directions to avoid the winding of air hoses to actuators 79 and of wires to grippers 77, 78, which would occur if such movements were to continue in one direction.

Furthermore, a preferred version of the present invention returns each textured disk 49 to the cassette pocket 51 from which it has been taken, leaving the pockets 51 which have been determined to be empty by proximity sensor 70a in an empty condition. These conditions are achieved in a preferred version of the present invention, by allowing the simultaneous movement of two disks 49 by the pick and place mechanism 71, and by using the indexing conveyor 57 to return cassette 58 to the position in which disk lifter 59 accesses the pocket from which a disk 49 was taken before replacing the disk 49 in the cassette 58.

As a disk 49, which is hereinafter called the "A" disk 49 for convenience, is being taken through the texturing process by spindle 86, a "B" disk 49, which is the next disk 49 in the direction opposite arrow 50 past the cassette pocket 51 from which the "A" disk 49 has been taken, is found by movement of the cassette 58 in the direction of arrow 50 past the proximity sensor 70a. At this point, the movement of cassette 58 is stopped, and disk lifter 59 moves the "B" disk 49 upward, into the position indicated by phantom line 82. When the process of texturing the "A" disk 49 is finished, spindle 86 moves the "A" disk 49 into the position indicated by phantom line 83. When both the "A" and "B" disks 49 have been positioned in this way, pick-and-place mechanism 71 moves to the rear, in the direction of arrow 50, and both sets of grippers 77, 78 are closed to grasp the "A" and "B" disks 49. Within the spindle 86, shaft 90 (shown in FIG. 8) is moved to the front, moving clamping blocks 95 inward to disengage the spindle from the "A" disk 49, and the disk lifter 59 moves downward to disengage from the "B" disk 49. Next, the pick-and-place mechanism 71 moves forward, opposite the direction of arrow 50, and the arm rotational drive motor 75 drives arm 72 through a 180-degree angle in the direction of arrow 74. Now, the positions of the "A" and "B" disks 49 are reversed, with the "A" disk 49 being positioned for movement through the texturing process on spindle 86, and with the "B" disk 49 being positioned for return to cassette 58. Next, pick-and-place mechanism 71 moves to the rear, in the direction of arrow 50, placing the "B" disk 49 on spindle 86, and aligning the "A" disk 49 with disk lifter 59.

Thus, a first disk transfer point is established at the disk location shown by phantom line 82, and a second disk transfer point is established at the disk location shown by phantom line 83, both with pick-and-place mechanism 71 moved to the rear, in the direction of arrow 50. At the first disk transfer point, a disk 49 is transferred in either direction between pick-and-place mechanism 71 and disk lifter 59. At the second disk transfer point, a disk 49 is transferred in either direction between pick-and-place mechanism 71 and spindle 86.

In a preferred mode of operation, computing system 70 stores data indicating the pocket 51 within cassette 58 from which each disk is taken. This data is subsequently used to determine how the cassette 58 is moved opposite the direction of arrow 50 to return to the place from which the "A" disk 49 has been taken. When a cassette full of disks to be textured has been loaded into the disk-handling station 38, the cassette is moved one pocket position in the direction opposite that of arrow 50, from the position in which the pocket at which "B" disk 49 has been taken is directly above disk lifter 59, to the position in which the pocket at which "A" disk 49 has been taken is above disk lifter 59. If the cassette 58 was not full of disks 49 to be textured when it was loaded into disk-handling station 48, the cassette 58 may have to be moved farther than one pocket position opposite the direction of arrow 50. In any case, the cassette is moved so that the pocket from which the "A" disk 49 was taken is above disk lifter 59, using disk position data stored within computing system 70 and moving the cassette using indexing conveyor 57. This cassette movement can occur as the "A" disk is being moved, by pick-and-place mechanism 71, into place for reinsertion into the cassette 58, with the pick-and-place mechanism 71 moved forward, opposite the direction of arrow 50.

Next, disk lifter 59 moves upward, engaging "A" disk 49 within its groove 84, and the shaft 90 (shown in FIG. 8) is moved rearward, in the direction of arrow 50, so that clamping blocks 95 are extended outward to hold "B" disk 49 (also shown in FIG. 8) on the spindle 86. The grippers holding the "A" disk are opened, and disk lifter 59 moves downward, restoring "A" disk 49 into the pocket 51 from which it was taken, and spindle 86 moves inward, in the direction of arrow 102, while rotationally accelerating the disk to the rotational velocity at which texturing will occur. In this way, preparations are made to texture the next disk 49, which is, at this time, the "B" disk.

The first disk 49 taken from each individual cassette 58 is moved alone from disk lifter 59 to spindle 86, without the simultaneous movement of another disk 49 in the opposite direction, since there is no other disk available for such movement. Similarly, the last disk 49 taken from each individual cassette 58 is moved alone from spindle 86 to disk lifter 59, since there is no other disk available for movement in the opposite direction. The determination that the last disk 49 to be textured has been removed from the cassette 58 is made when the last pocket 51 into which disks 49 can be placed is moved past disk lifter 59 without the detection of another disk 49 by proximity sensor 70a. Only a single cassette 58 at a time is moved onto indexing conveyor 57, with all of the disks 49 to be textured within the cassette 58 being removed from the cassette 58, sent through the texturing process, and returned to the cassette 58 before any of the disks 49 in the next cassette 58 are so processed.

Figure 9:
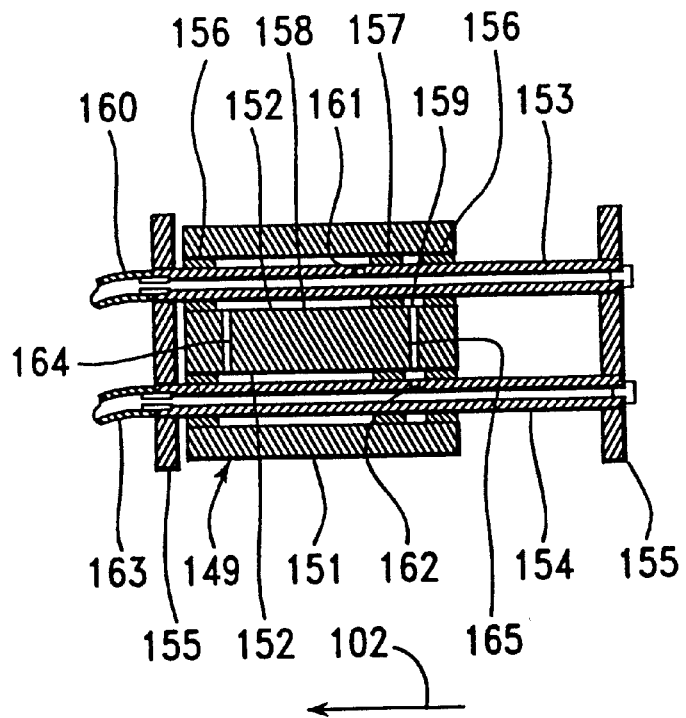
FIG. 9 is a cross-sectional plan view of a slider used to move cassettes filled with textured disks from one conveyer to another in the tool of FIG. 4.

FIG. 9 is a cross-sectional plan view of a slider mechanism 149 used to move a transfer table 150 on which cassettes are transferred from indexing conveyor 57 to output conveyor 61, taken as indicated by section lines IF—IF in FIG. 6.

Referring to FIGS. 6 and 9, the transfer table 150 is mounted atop slider mechanism 149, including a slider 151, having a pair of cylinders 152, through which a pair of hollow shafts 153, 154 extend. The shafts 153, 154 are in turn mounted to extend between end blocks 155. The slider 151 is slidably mounted on the shafts 153, 154 by means of bearing assemblies 156, which also include air-tight seals preventing the outward flow of air from the ends of cylinders 152. A central piston 157 is also attached to slide with the slider 151 along each shaft 153, 154. Each piston 157 includes seals separating the cylinder 152, within which it is attached, into an inward chamber 158 and an outward chamber 159, each of which is alternately filled with compressed air or exhausted to effect movement of the slider 151.

To move slider 151 inward, in the direction of arrow 102, compressed air is directed to the inward chambers 158, from hose 160, through a hole 161 in shaft 153. As this occurs, air is exhausted from outward chambers 159, through a hole 162 in shaft 154, and through hose 163. Both inward chambers 158 are connected by an inward transverse hole 164, and both outward chambers 159 are connected by an outward transverse hole 165. Thus, as compressed air is directed through hose 160 while hose 163 is exhausted to the atmosphere, the resulting expansion of inward chambers 158, together with a contraction of outward chambers 159, moves slider 151 inward, in the direction of arrow 102, aligning transfer table conveyor 60 with indexing conveyor 57.

Similarly, to move slider 151 outward, opposite the direction of arrow 102, compressed air is directed to the outward chambers 159, from hose 163, through hole 162 in shaft 154. As this occurs, air is exhausted from inward chambers 158, through hole 161 in shaft 153, and through hose 160. Thus, as compressed air is directed through hose 163 while hose 160 is exhausted to the atmosphere, the resulting expansion of outward chambers 159, together with a contraction of inward chambers 158, moves slider 151 outward, opposite the direction of arrow 102, aligning transfer table conveyor 60 with output conveyor 61.

The movement of a cassette 58 following the return thereto of all disks 49, having been textured, will now be discussed, with specific references being made to FIGS. 5, and 6.

Thus, referring to FIGS. 5 and 6, when it is determined that the last disk 49 to be textured in a cassette 58 has been processed and returned to the cassette 58, both intermediate conveyor 57 and transfer table conveyor 60 are turned on to move the cassette 58 rearward, in the direction of arrow 50, until the cassette 58 is completely on transfer table conveyor 60, as indicated by the output of transfer table cassette sensor 69. Upon the indication of sensor 69, movement of conveyors 57 and 60 is stopped, and a slider mechanism 149 is operated to drive the transfer table 150, which includes transfer table conveyor 60, in an outward direction, opposite the direction of arrow 102 along hollow shafts 153, 154. After this motion is stopped with transfer table conveyor 60 in alignment with output conveyor 61, the conveyors 60, 61 are turned on to move cassette 58 to the front, opposite the direction of arrow 50. If other cassettes are not stored along the output conveyor 61, this movement is stopped when the cassette has been brought to the front of the conveyor 61, to the position in which cassette 166 is shown in FIG. 5, as indicated by a first output cassette sensor 168. At this point, the cassette 166, with processed disks 49, is ready for removal from the disk texturing tool 37.

Continuing to refer to FIG. 5, while this condition of readiness is preferably communicated to the system operator through a visible or audible indication, the removal of a cassette 166 with textured disks 49 is not generally required to permit continued operation of the disk texturing tool 37. Space is provided along output conveyor 61 for the storage of a number of cassettes 166 filled with textured disks 49. In a first version of this output system, all such cassettes 166 are stored along the surface of output conveyor 61. In a second version of this output system, the first cassette to reach the front of output conveyor 61 is stored on a raised platform The operation of the first version of this output system will now be described. In this version, if a cassette 166 is waiting for removal at the front of output conveyor 61 when the processing of disks 49 within another cassette 58 is completed, output conveyor 61 is turned on to move the cassette 166 rearward, in the direction of arrow 50. This movement is stopped when the presence of cassette 166 is detected by a second output cassette sensor 170. Then, with transfer table conveyor 60 in alignment with output conveyor 61, both transfer table conveyor 60 and output conveyor 61 are turned on to move cassettes 166 and 58 together to the front of conveyor 61, where this motion is stopped as first output cassette sensor 168 detects the presence of cassette 166. If necessary, this process is repeated several times, until output conveyor 61 is filled with a queue of cassettes holding disks 49 which have completed the texturing process. In each case, the rearward motion of output conveyor 61, in the direction of arrow 50, is stopped when the rearmost cassette in the queue reaches second output cassette sensor 170, and the subsequent forward motion of output conveyor 61 is stopped when the forwardmost cassette in the queue reaches first output cassette sensor 168.

The operation of the second version of this output system will now be described. This version requires an additional cassette lifting platform 172, which is similar to the platform 54 used with input conveyor 47, and a third output cassette sensor 174. With this version, the first cassette 166 to reach the end of output conveyor 61 is raised off the conveyor with lifting platform 172, to remain in a raised position until it is removed by the tool operator. With a cassette 166 in the raised position, output conveyor 61 is operated in both directions while not affecting the position of the cassette 166. Thus, when a second cassette, such as cassette 58, is loaded onto output conveyor 61, this conveyor 61 is turned on to drive the cassette forward, in the direction opposite arrow 50. This motion is stopped when the cassette is detected by third output cassette sensor 174. When the disks in a third cassette are completed, output conveyor 61 is turned on to drive the second cassette rearward. This motion is stopped when the second cassette is detected by second output cassette sensor 170. Then both transfer table conveyor 60 and output conveyor 61 are turned on to move the second and third cassettes forward, opposite the direction of arrow 50, until the second cassette is detected by third output cassette sensor 174.

Again, this process is repeated until output conveyor 61 is filled with a queue of cassettes holding disks 49 which have completed the texturing process. In each case, the rearward motion of output conveyor 61, in the direction of arrow 50, is stopped when the rearmost cassette in the queue reaches second output cassette sensor 170, and the subsequent forward motion of output conveyor 61 is stopped when the forwardmost cassette in the queue reaches third output cassette sensor 174. These movements occur as the first cassette 166 remains on raised platform 172.

At any point, if the cassette 166 on platform 172 is removed by the tool operator with one or more cassettes remaining on output conveyor 61, the conveyor 61 is turned on to drive the next cassette to the end of the conveyor 61, as detected by first output cassette sensor 168. The platform 172 is again raised to lift this cassette off output conveyor 61.

The methods described above for handling cassettes provide the particular advantage of not operating any conveyor system 47, 57, 60, 61 in sliding contact with a cassette. The generation of wear particles from relative motion between conveyor systems and cassettes is therefore avoided. Such wear particles could otherwise contaminate the manufacturing process of which this texturing is a part. Furthermore, the useful life of conveyor belts and cassettes is increased, with cassettes and conveyer belts being likely to last as long as various other moving parts of the disk texturing tool 37.

The configuration of output conveyor 61 extending alongside input conveyor 47 provides the advantage of bringing output cassettes, holding disks which have gone through the texturing process, back to a place adjacent to the place where input cassettes are loaded. This facilitates servicing the tool 37 by personnel who must both load and unload cassettes. Furthermore, additional space for queuing cassettes along the conveyors is gained without having to increase the length of the tool 37 along the conveyors.

The preceding discussion of the movement of cassettes and disks has focussed on such movement within right disk-handling station 38 of the laser-texturing tool 37. Thus, the various movements of disks and cassettes described above are used alone if the left disk-handling station 39 is not available. For example, the left disk-handling station may not be available due to a technical problem, or simply because cassettes have not been loaded into it. Furthermore, an embodiment of the present invention has only a single disk-handling tool, which is operated as described in detail above. Nevertheless, in the preferred method of operation of the preferred embodiment of the present invention, which will now be described with particular reference being made to FIG. 5, both right disk-handling station 38 and left disk-handling station 39 are used in an alternating fashion to present disks to be textured within laser-texturing station 40.

Thus, referring to FIG. 5, in a preferred version of the present invention, the operation of left disk-handling station 39 is generally the same as operation of right disk-handling station 38, with various elements of the apparatus within the left disk-handling station 39 being mirror image configurations of corresponding elements within the right disk-handling station 38. The preceding discussion of operations within right disk-handling station 38 is equally applicable to operations within left disk-handling station 39, with rearward motions, in the direction of arrow 50, remaining the same, and with inward motions, in the direction of arrow 102 continuing to be directed toward the center of the laser texturing tool 37, in the direction of arrow 166, within left disk-handling station 39. Similarly, forward motions, opposite the direction of arrow 50 are in the same direction in both left and right disk-handling stations 38, 39, while outward motions in left disk-handling station 39 are opposite the direction of arrow 166.

Within disk-texturing station 40, right shuttling mirror 138 is mounted on a mirror slide 176, together with a left shuttling mirror 178. Mirror slide 176 is operated pneumatically, sliding on a pair of shafts 180, using a mechanism operating generally as described above in reference to FIG. 9. With mirror slide 176 in its leftward position, moved in the direction of arrow 181 as shown in FIG. 5, the laser beams passing through power control optics block 136, having been derived from the output of infrared laser 108, are directed to disk 49, clamped on spindle 86 of right disk-handling station 39, as previously described. Mirror slide 176 is alternately moved into a rightward position, so that the laser beams passing through power control optics block 136 reflect off left shuttling mirror 178, being directed to a disk 182 held by spindle 184 of left disk-handling station 39. In this way, the laser beams employed in the disk texturing process are directed to either disks within the right disk-handling station 38 or left disk-handling station 39 simply by moving mirror slider 176.

While the above discussion describes the use of a sliding mechanism having two mirrors to direct the laser beams between the two disk-handling stations 38, 39, a single pivoting mirror could alternately be used for this purpose.

The operation of right disk-handling station 38, which has been described in some detail above, may be considered to consist basically of disk-movement cycles alternating with texturing cycles, wherein each disk movement cycle consists of the movement of one or two disks by pick-and-place mechanism 71, and wherein each texturing cycle consists of the movement of a single disk on the spindle 86. Whenever sufficient disks are available for texturing to allow the disk texturing tool 37 to operate at full capacity, each disk-movement cycle of right disk-handling station 38 occurs simultaneously with a texturing cycle of left disk-handling station 39, and each disk-movement cycle of left disk-handling station 39 occurs simultaneously with a texturing cycle of right disk-handling station 38. In this way, the use of the texturing process available through operation of infrared laser 108 is maximized, along with the overall process speed of the laser texturing tool 37. However, when disks to be textured are not available from one of the disk-handling stations 38, 39, the other disk handling station can continue to run at its full speed.

Referring to FIGS. 5–7, a preferred version of the present invention includes a bar code scanner 186 for reading bar code labels (not shown) placed on a side of a cassette 48, which is put on platform 54. To use this feature, the computing unit 70 executes a program relating bar codes read by scanner 186. Data gathered by reading bar code labels may be stored and used by an inventory control system to keep track of work in process.

The present invention provides advantages of optimized productivity and flexibility. In a preferred mode of operation, both disk-handling stations 38, 39 are simultaneously used as described above, maximizing the rate of production for the laser texturing tool 37. The use of laser 108 is optimized, with various disk-handling processes in each disk-handling station 38, 39 occurring while a disk 49, 172 in the other disk-handling station is being exposed to the laser. The use of separate disk-handling stations also provides flexibility; if either of the disk-handling stations 38, 39 is disabled, production can continue at a reduced rate using the other disk-handling station. A single disk-handling station 38, 39 can also be used, if desired, when untextured disks sufficient for the use of both stations are not available for the process.

Referring again to FIGS. 5 and 5B, the preceding discussion has described a method for texturing disks using a laser beam system which has been manually adjusted to provide a certain overall power at a single beam 135 and for balancing the two beams 136m resulting from splitting the single beam 135. The laser beam system may alternately be set up by providing more laser power than necessary in the single beam 135 and by subsequently adjusting each beam 136m to a level defined by a set point, so that each beam 136m is attenuated during the adjustment process by the corresponding liquid crystal variable retarder 136b.

Furthermore, a preferred version of the present invention includes automatic means for initially making the laser power adjustments and for maintaining these adjustments.

Figure 10:
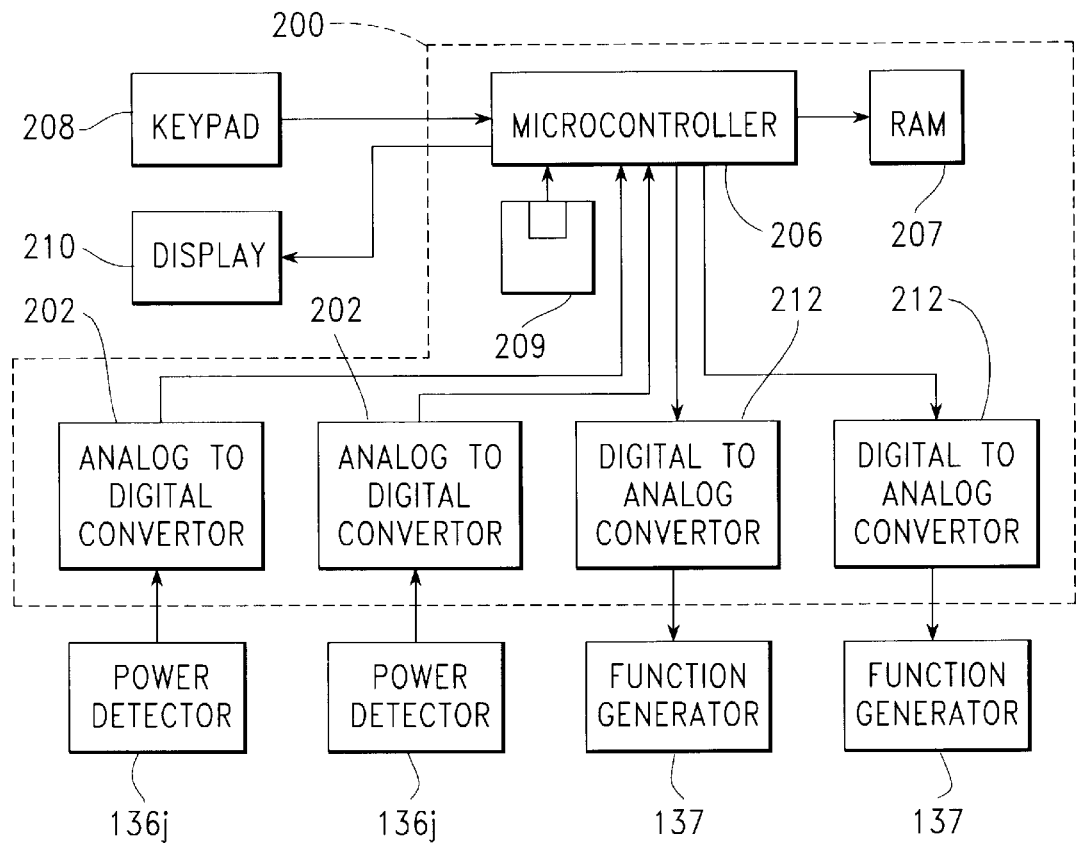
FIG. 10 is a block diagram of electronic apparatus for controlling the power level within laser beams within the tool of FIG. 4.

FIG. 10 is a block diagram of a subsystem 200 for adjusting and maintaining the power in a laser single beam 136m at a set-point level. Referring to FIGS. 5B and 10, inputs to the subsystem 200 are provided by the outputs of a laser power detectors 136j, which have previously been discussed in reference to FIG. 5B, each of which measures the power of a single beam 136m. The output of each detector 136j is fed into an analog to digital convertor 202, and the outputs of the two convertors 202 are individually provided as 12-bit inputs to ports of a microcontroller 206. Program and data information is stored in a random access memory 207 of the microcontroller 206. Operator inputs to the microcontroller 206 are provided through a keypad 208, while program information is typically loaded into the microcontroller 206 through a magnetic diskette 209. A display unit 210 is also connected to receive outputs from the microcontroller 206. Two output ports of the micro controller 206 are individually connected to digital to analog convertors 212. The output of each digital to analog convertor 212 drives an input of a function generator 137, which in turn produces a 2KHz square wave function having a voltage determined by the output voltage of the attached digital to analog convertor 212. As previously described in reference to FIG. 5B, each function generator 137 drives a liquid crystal variable retarder 136b, which variably attenuates the power level of an associated laser beam 136m.

Figure 11:
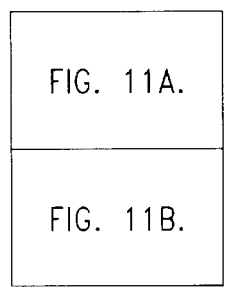
FIG. 11 is a flow chart of a program executed in the microcontroller of FIG. 10.
Figure 11A:
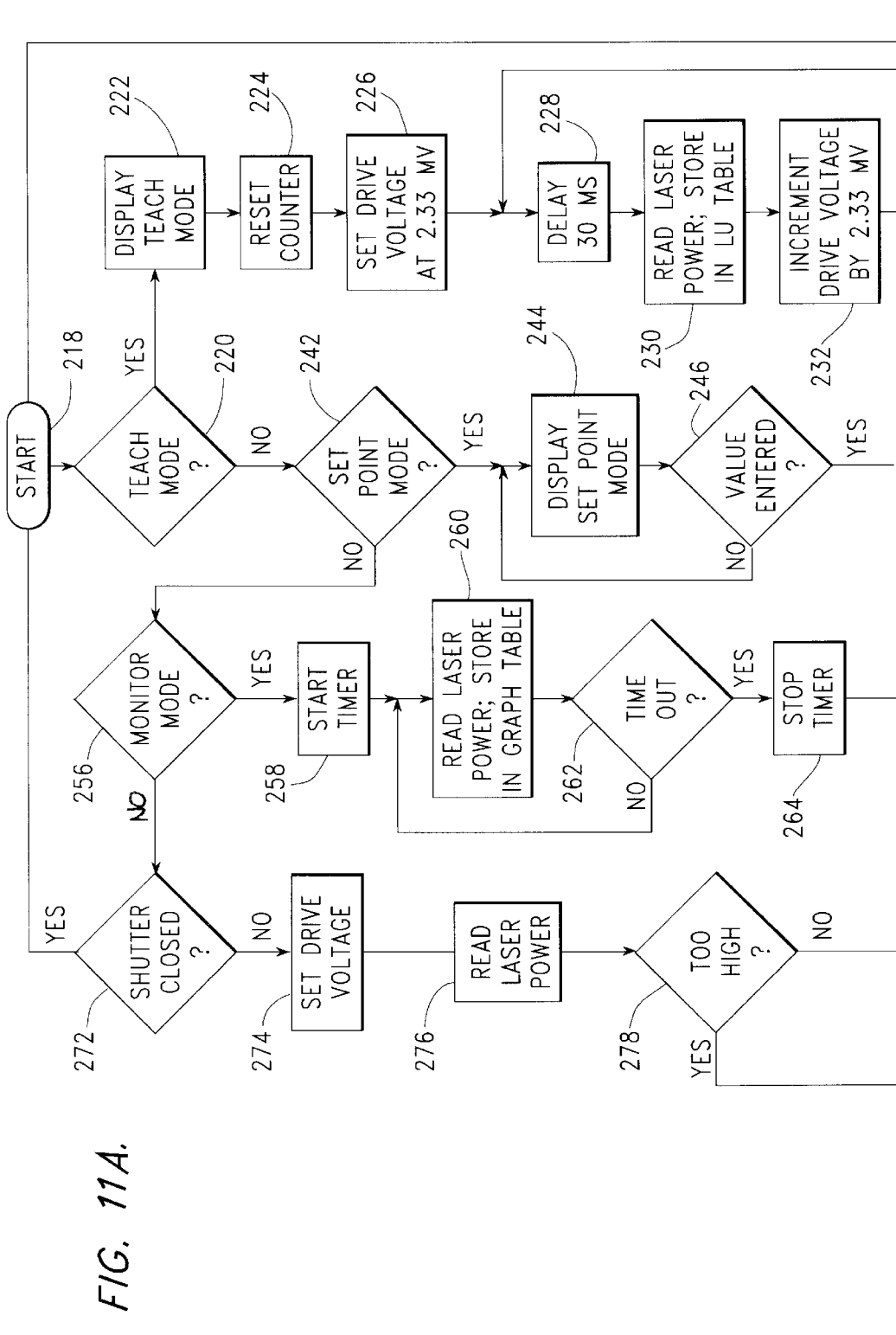
Figure 11B:
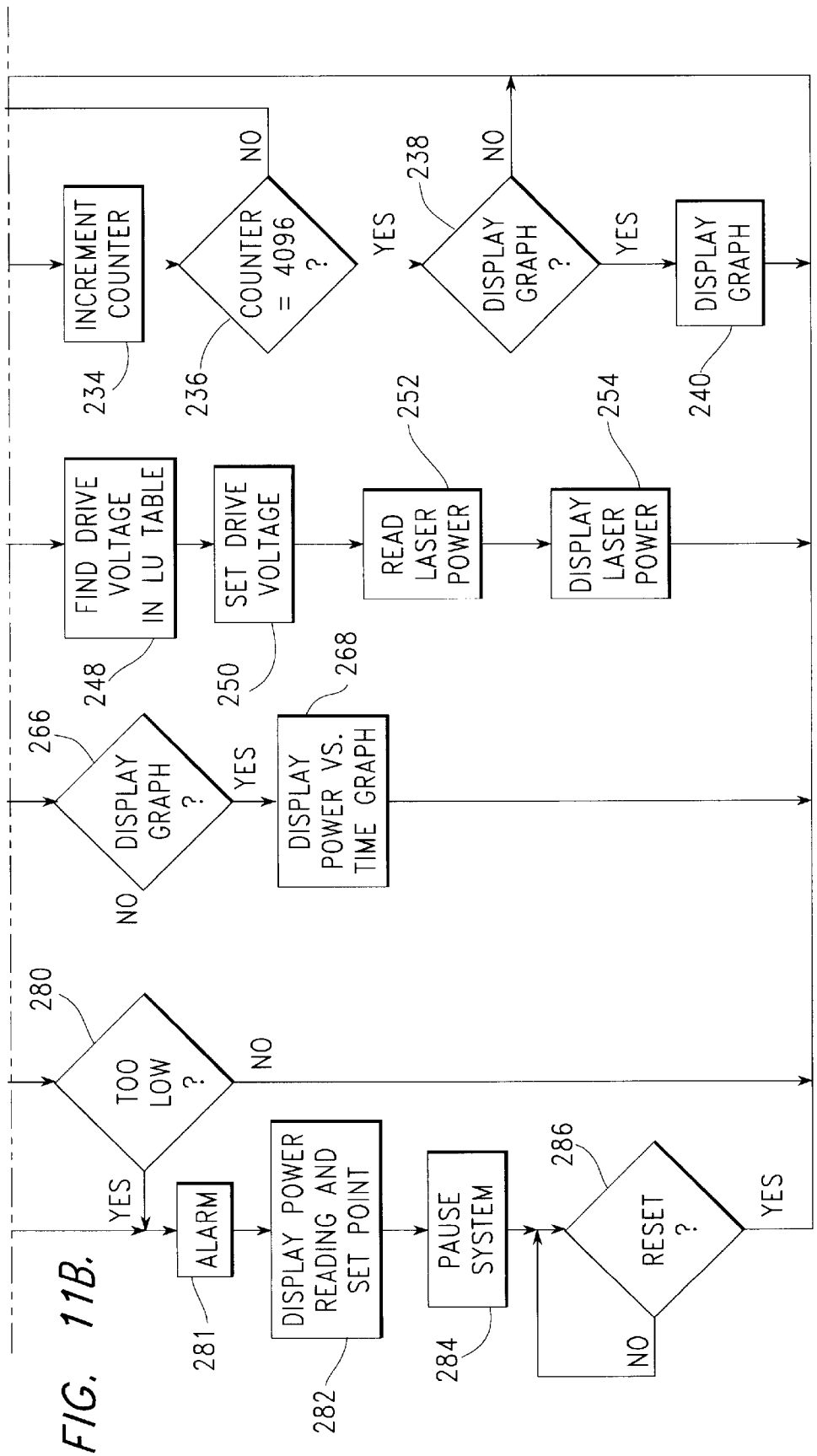

FIG. 11 is a flow diagram of a program executing in the microcontroller 206. This program can operate in a teach mode, a set point mode, a monitor mode, or a run mode. The system operator determines the mode in which the system is placed, indicating his choice by means of the keypad 208 (shown in FIG. 10). Each mode is entered from a start point in block 218.

Referring to FIGS. 5B, 10, and 11, in the teach mode, which is entered with an affirmative determination in block 220, the microcontroller 206 reads the power of a laser beam 136m while stepping the voltage driving the function generator 137, which in turn drives the liquid crystal variable retarder 136b associated with the laser beam 136m being measured. In the first segment of the teach mode, several initialization functions are performed, with a teach mode screen being sent to the display 210 in block 222, with a counter being reset to zero in block 224, and with the output voltage level to the function generator 137 being set to an initial value of 2.33 mv in block 226.

Next, a program loop is entered, with a 30 ms (millisecond) delay in block 228 providing time for the retarder 136b to stabilize before the laser power is read in block 230 and stored in a table within memory 207. Next, in block 232, the voltage driving the function generator 137 is increased by the incremental value of 2.33 volts. Then, in block 236, a determination is made of whether the counter value has reached 4096. This exemplary value represents a pre-determined level at which the teach mode is determined to be completed. If this value has not been reached, the system returns to block 228, to repeat the process of measuring a laser power level and incrementally increasing the drive voltage level. Each time this occurs, the measured drive voltage and drive power level associated therewith are stored as corresponding values of a look-up table being built in memory 207.

After the end of the teach mode has been reached, as determined in block 236, a further determination is made in block 238 of whether the operator has chosen to display a graph of power versus driving voltage. If the operator has chosen this display, as indicated by an affirmative determination in block 238, such a graph is displayed on the display unit 210 in block 240. In either case, after the completion of the teach mode, the system returns to the start point 218.

In the set point mode, which is entered with an affirmative determination in decision block 242, the operator can enter the value desired for a laser power set point through the key-pad 208. The controller then determines the drive voltage associated with this power level from the look-up table stored in memory 207. The 12-bit code associated with this drive voltage is then sent to the corresponding digital to analog convertor 212. The operator can perform this routine as often as needed, until the system is properly set up.

Thus, the set point mode is started in block 244, as a screen for this mode is shown on display unit 210. The system then waits, going through a loop from decision block 246, for the operator to enter a set point value. When such a value has been entered, the system, in block 248, finds the drive voltage associated with this set point value. In block 250, this drive voltage is applied to the function generator 137. In block 252, the power of the corresponding laser beam 136m is read, to be displayed through the display unit 210 in block 254. The system then returns to start point 218.

The monitor mode is used to determine variations in the output power of laser 108 (shown in FIG. 5) with time. Thus, after the monitor mode is entered, as determined by an affirmative determination in block 256, a timer is started in block 258. A laser power level is read in block 260 and stored in a power table along with the time, from the timer, at which it is produced. Until a pre-set time out time value is reached, as indicated by an affirmative determination in block 262 the measurement and storage functions of block 260 are repeated on a periodic basis. When this time out condition has been reached, the timer is stopped in block 264. Next, a determination is made in block 266 of whether the operator has indicated, using the keypad 208, that a graph showing the variation of laser power with time is to be displayed. Thus, an affirmative determination in block 266 results in the display of such a graph on display unit 210 in block 268.

Normal operation of the laser texturing tool 37 (shown in FIG. 4) is accomplished in the run mode. When the run mode is selected, as indicated by an negative determination in block 256, since the other possible modes have been eliminated at this point, the system is locked to a laser power set point previously determined through operation in the set point mode. Changes are made in the drive voltage into the function generator 137 so that the corresponding laser beam 136m is held near the set point power, as measured by the corresponding power detector 136j. If the laser beam power is outside predetermined limiting values, an alarm is sounded, and the tool 37 is placed in a paused mode.

In the run mode, the system first determines, in block 272, whether the process shutter 114 (shown in FIG. 5) is closed. If it is closed, no new data can be derived, so the system returns to start point 218 without changing the set point. If the shutter is not closed, as indicated by a negative determination in block 272, the function generator 137 is driven in block 274 with a drive voltage determined by the microcontroller 206 to correct the laser power measured on a previous pass through this routine to the set point value. (On the first pass, a set point voltage as determined in the set point mode is used for this purpose). Next, in block 276, the actual laser power is read. To continue running the system, the laser power must be within pre-determined limits.

If this power is too high, as determined in block 278, or too low, as determined in block 280, an alarm is sounded in block 281, the power reading and set point are displayed on display unit 210 in block 282, and the laser texturing tool 37 (shown in FIG. 4) is placed in pause mode in block 284. From this point, the system waits for the operator to press a reset switch, as determined in block 286, before stopping the alarm. Even if the alarm is stopped, production remains halted until corrections are made by the operator, who then takes the system out of pause mode.

If the laser power is within the pre-set limits, the system continues, repeatedly going through a loop including the run mode sequences and returning to the start point 218 as, within limits, excursions in laser power are corrected by changes in the voltage driving the function generator 137.

The preceding discussion in reference to FIG. 11 has covered a situation in which a program is used to control the power within a single laser beam 136m. In reality there are two such beams 136m to be controlled during the laser texturing process. It is therefore understood that processor 206 is operating as a multitasking processor running the program discussed in reference to FIG. 11 for each of these two laser beams 136, with data supplied through the two analog to digital convertors 202 and supplying data to the two digital to analog convertors 212.

While the invention has been described in its preferred form or embodiment with some degree of particularity, it is understood that this description has been given only by way of example and that numerous changes in the details of construction, fabrication and use, including the combination and arrangement of parts, may be made without departing from the spirit and scope of the invention.

What is claimed is:

1. Apparatus for directing portions of a laser beam simultaneously at opposite sides of a first disk being textured by pulses from said laser beam, wherein said apparatus comprises:

a first beamsplitter dividing said laser beam into transmitted and reflected beams;

first beam directing means for directing said transmitted beam along a first optical path and for directing said reflected beam along a second optical path;

attenuation means disposed along each said optical path for controlling an output power level of an output beam directed therefrom;

power detection means disposed along each said optical path for measuring said output power level, and second beam directing means for directing a first output beam along said first optical path to a first side of said first disk and for directing a second output beam along said second optical path to a second side of said first disk, opposite said first side thereof.

2. The apparatus of claim 1, wherein each said attenuation means comprises:

a variable retarder changing an angle of polarization of a polarized laser beam transmitted therethrough in accordance with an input voltage applied to said variable retarder;

a polarizing beamsplitter receiving an input beam in said first direction along said optical path from said variable retarder, wherein said polarizing beamsplitter transmits a first portion of said input beam, having a first polarity, along said optical path, and wherein said polarizing beamsplitter reflects a second portion of said input beam, having a polarity perpendicular to said first polarity, away from said optical path.

3. The apparatus of claim 2:

wherein said apparatus additionally comprises a quarter-wave-length plate disposed along each said optical path; and wherein a laser beam reflected back from said first disk is reflected away from said optical path by said polarizing beamsplitter.

4. The apparatus of claim 1, wherein said power detection means comprises:

a non-polarizing beamsplitter transmitting a transmitted portion of an intermediate beam along said optical path from said attenuation means, and reflecting a reflected portion of said intermediate beam away from said optical path; and a power detection transducer receiving as an input said reflected portion of said intermediate beam and producing an output indicating a power level thereof.

5. The apparatus of claim 1:

wherein said first and second optical paths extend from said first beamsplitter in a first direction, being spaced apart and parallel;

wherein a plane of reflection within said first beamsplitter extends in said first direction midway between said first and second optical paths;

wherein said laser beam is directed at said plane of reflection with a 45-degree angle on incidence thereto; and wherein said first beam directing means includes a first reflective surface at which said transmitted beam is directed at a 67.5 degree angle of incidence and a second reflective surface at which said reflected beam is directed at a 67.5 degree angle of incidence.

6. The apparatus of claim 1, wherein said second beam directing means includes:

a first reflective surface directing said first output beam toward said first side of said first disk, wherein said first reflective surface is adjustable to vary a first radius on said disk at which said first output beam strikes said disk; and a second reflective surface directing said second output beam toward said second side of said first disk, wherein said second reflective surface is adjustable to vary a second radius on said disk at which said second output beam strikes said disk.

7. The apparatus of claim 6:

wherein each said reflective surface is pivotally adjustable on a stage; being positioned so that a beam from said optical path, reflected at said disk, is not returned along said optical path, and wherein each said stage is adjustable in a direction perpendicular to an adjacent surface of said first disk.

8. The apparatus of claim 1, comprising additionally:

a beam expander through which said laser beam passes to form a slightly divergent expanded beam;

a first focussing lens in said first optical path to focus said first output beam on said first side of said disk; and a second focussing lens in said second optical path to focus said second output beam on said second side of said disk.

9. The apparatus of claim 8, wherein each said focussing lens is adjustable along said optical path for beam focussing extending therethrough and in a plane perpendicular to said optical path for beam centering within said focussing lens.

10. The apparatus of claim 1, comprising additionally:

third beam directing means for directing said first output beam along a third optical path to a first side of a second disk and for directing said second output beam along a fourth optical path to a second side of said second disk: and a movable mirror assembly movable between a first position in which said output beams are directed therefrom along said first and second optical paths and a second position in which said output beams are directed therefrom along said third and fourth optical paths.

11. Apparatus for directing portions of a laser beam simultaneously at opposite sides of a first disk being textured by pulses from said laser beam, wherein said apparatus comprises:

a first beamsplitter dividing said laser beam into transmitted and reflected beams, wherein said first beamsplitter includes a reflective surface as a 45-degree angle of incidence with said laser beam;

a first steering mirror having a 67.5-degree angle of incidence with said transmitted beam, reflecting said transmitted beam to extend along a first optical path in a first direction;

a second steering mirror having a 67.5-degree angle of incidence with said reflected beam, reflecting said reflected beam to extend along a second optical path, parallel to said first optical path, in said first direction; and output beam directing means for directing said transmitted beam along said first optical path to a first side of said first disk and for directing said reflected beam along said second optical path to a second side of said first disk, opposite said first side thereof.

12. The apparatus of claim 11, wherein said output beam directing means includes:

a first reflective surface directing said first output beam toward said first side of said first disk, wherein said first reflective surface is adjustable to vary a first radius on said disk at which said first output beam strikes said disk; and a second reflective surface directing said second output beam toward said second side of said first disk, wherein said second reflective surface is adjustable to vary a second radius on said disk at which said second output beam strikes said disk.

13. The apparatus of claim 12:

wherein each said reflective surface is pivotally adjustable on a stage; being positioned so that a beam from said optical path, reflected at said disk, is not returned along said optical path, and wherein each said stage is adjustable in a direction perpendicular to an adjacent surface of said first disk.

14. The apparatus of claim 11, comprising additionally:

a beam expander through which said laser beam passes to form a slightly divergent expanded beam;

a first focussing lens in said first optical path to focus said first output beam on said first side of said disk; and a second focussing lens in said second optical path to focus said second output beam on said second side of said disk.

15. The apparatus of claim 14, wherein each said focussing lens is adjustable along said optical path for beam focussing extending therethrough and in a plane perpendicular to said optical path for beam centering within said focussing lens.

16. The apparatus of claim 11, comprising additionally:

third beam directing means for directing said first output beam along a third optical path to a first side of a second disk and for directing said second output beam along a fourth optical path to a second side of said second disk: and a shuttling mirror assembly movable between a first position in which said output beams are directed therefrom along said first and second optical paths and a second position in which said output beams are directed therefrom along said third and fourth optical paths.

* * * * *